United States Patent [19]
Rhaney et al.

[11] Patent Number: 5,249,438
[45] Date of Patent: Oct. 5, 1993

[54] MOBILE COOLER WITH RETRACTABLE WHEELS AND HANDLES

[75] Inventors: Michael A. Rhaney, Atlanta, Ga.; Randall Bartlett, Opelika, Ala.

[73] Assignee: Systemwide Product, Scottdale, Ga.

[21] Appl. No.: 932,643

[22] Filed: Aug. 20, 1992

[51] Int. Cl.⁵ ............................................. F25D 3/08
[52] U.S. Cl. ................................. 62/457.7; 62/457.1; 190/18 A; 190/115; 280/37; 280/43.1; 280/47.26; 280/655
[58] Field of Search ............ 62/457.1, 457.7, 239, 62/371; 190/18 A, 115; 280/47.26, 655, 43.1, 37

[56] References Cited

U.S. PATENT DOCUMENTS

| | | | |
|---|---|---|---|
| 3,591,194 | 7/1971 | Vega | 280/47.26 |
| 3,842,953 | 10/1974 | Royet | 190/18 A |
| 4,164,853 | 8/1979 | McDonough | 62/457 |
| 4,460,188 | 7/1984 | Maloof | 280/30 |
| 4,724,681 | 2/1988 | Bartholomew et al. | 62/239 |
| 4,846,493 | 7/1989 | Mason | 280/641 |
| 4,865,346 | 9/1989 | Carlile | 280/654 |
| 4,873,841 | 10/1989 | Bradshaw et al. | 62/239 |
| 4,976,448 | 12/1990 | Wickersham et al. | 280/47.2 |
| 5,108,119 | 4/1992 | Huang | 190/18 A |

Primary Examiner—John M. Sollecito
Attorney, Agent, or Firm—Jason A. Bernstein

[57] ABSTRACT

A mobile cooler including a compartment having pivotable wheels and a handle assembly for pulling the cooler. A pair of wheel assemblies individually pivot within recesses in the cooler from a raised to a lowered position. In the lowered position the cooler can be transported over smooth or uneven terrain. The handle telescopes partly into the compartment, and partly folds down by a pair of hinges to fit within recesses in the compartment lid. The handle length can be adjusted to suit the user.

11 Claims, 3 Drawing Sheets

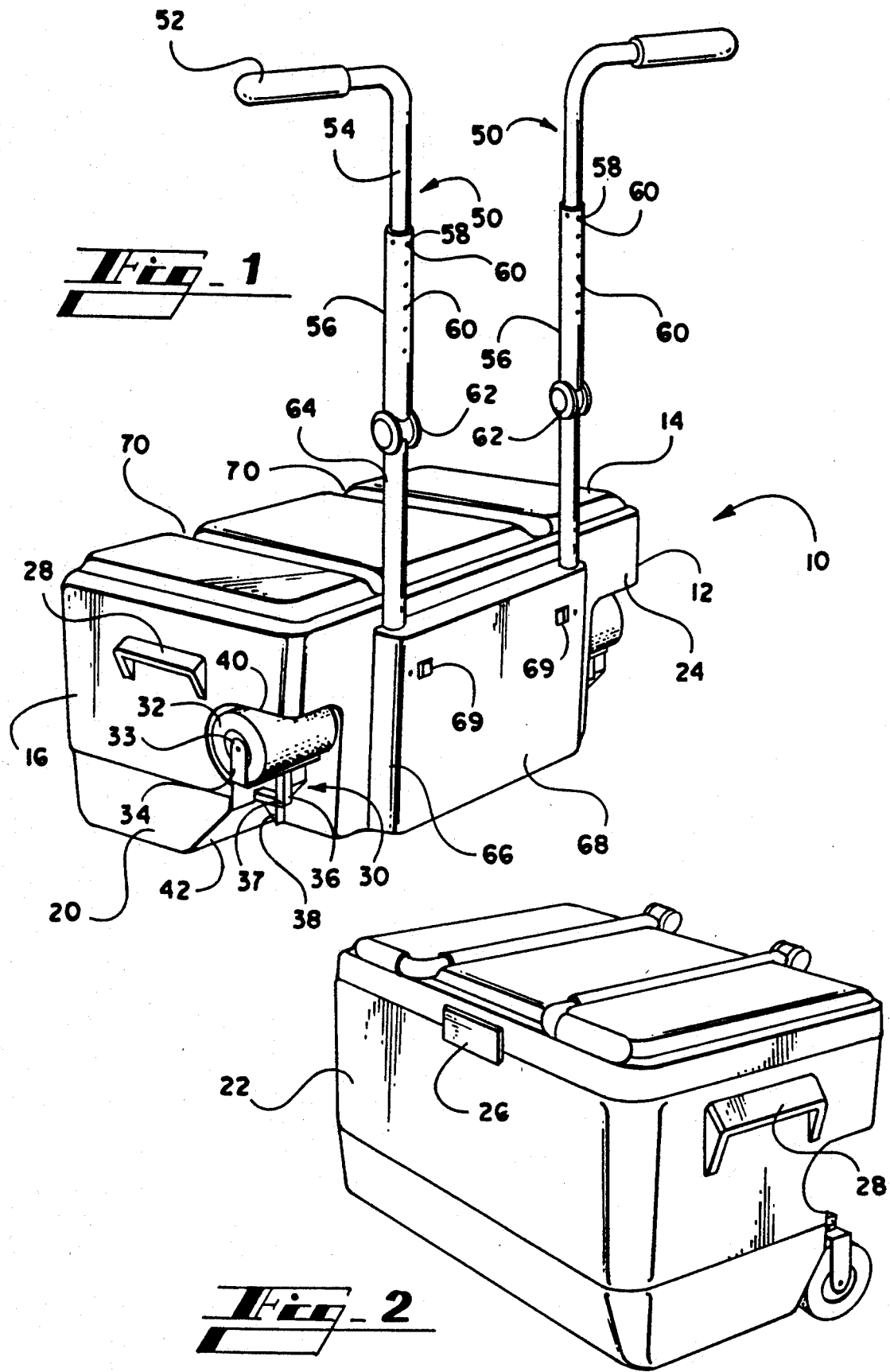

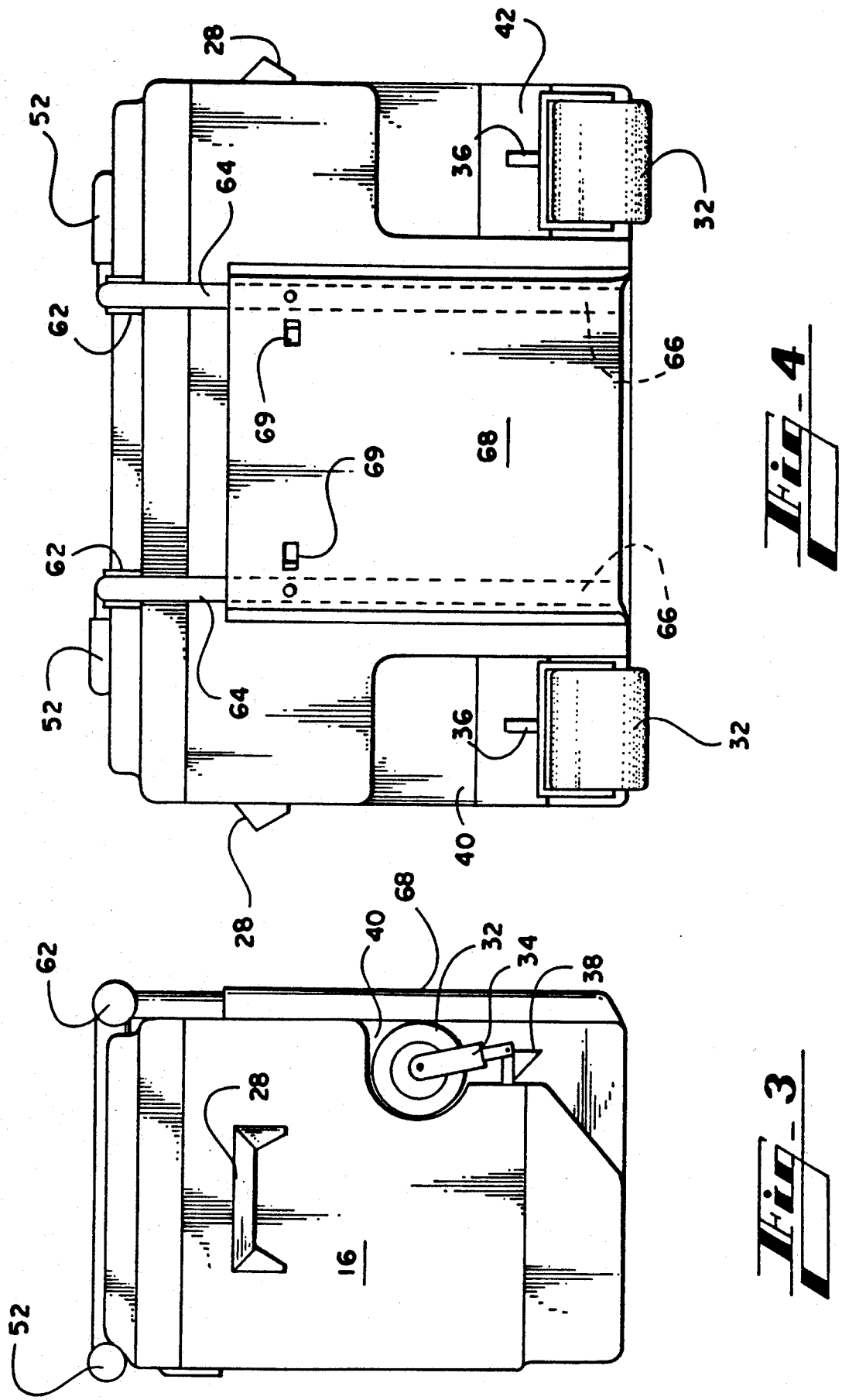

MOBILE COOLER WITH RETRACTABLE WHEELS AND HANDLES

FIELD OF THE INVENTION

The present invention relates to portable cooler chest, and more specifically to a portable cooler having a set of wheels and a handle enabling a user to transport the cooler over the ground.

BACKGROUND OF THE INVENTION

Coolers are generally known in the art. The most commonly used coolers are make of plastic, usually having some form of insulation between the inner and outer walls. Larger models capable of holding several bottles of refreshments, picnic food and copious quantities of ice require the recreator to carry the cooler by a pair of handles typically mounted on either side of the cooler. When the unit is nearly full, it can weigh in excess of fifty or so pounds, making carrying over long distances difficult and causing strain to the user.

In an attempt to remedy this deficiency in design, several patents address the problem of transport by adding wheels or a carting assembly to the cooler. U.S. Pat. No. 4,846,493, issued to Mason, describes a portable cooler with retractable wheels and a folding handle. The wheels are mounted on a single axle and must be raised or lowered by pivoting on a rod. Mason requires the cooler to be lifted by the handle to raise the side opposite the wheels off the ground, thereby still resulting in strain to the user. The locking mechanism is subject to jarring when moving over uneven terrain, thus potentially causing the wheel mechanism to jump out of the retaining hook member. The retracting arm and lock mechanism project outward adding additional width to the unit, making it more cumbersome to load into a car trunk and the design less aesthetically pleasing.

U.S. Pat. No. 4,724,681, issued to Bartholomew et al., shows a portable cooler having foldable handle mechanism whereby the handle segments fold at joints to wrap around the cooler compartment. The foldable joint at the base of the handle where it connects with the cooler compartment may be insufficient to withstand the stress of a fully loaded cooler. Other coolers have wheel mechanisms that protrude from the sides of the cooler, adding to the width of the unit and lessening its aesthetic appeal.

It would be desirable to have a cooler that was constructed to have a sturdy handle/carrying mechanism that would withstand heavy use, yet remain convenient for use by adults or children. Furthermore, such a unit would have a retractable wheel mechanism that conveniently and without undue manipulation folds the wheels up into the body of the cooler when not needed, thus providing a stable compartment.

SUMMARY OF THE INVENTION

Accordingly, the above-mentioned deficiencies are remedied by the present invention, which provides a portable cooler having a pair of adjustable wheels and a telescoping collapsible handle for transporting the cooler over the ground. More particularly, the present invention provides a cooler compartment having a lid, bottom, sides, front and back; a recess in each corner of the lower end of the sides sized to receive a wheel; a first arm extending outward from each recess each arm having an aperture located at the distal end capable of receiving a pin; a pair of essentially parallel apertures disposed vertically in the back; a pair of wheel assemblies one disposed within each recess each assembly comprising a wheel, an axle disposed axially through the center of the wheel, a bracket connected to each end of the axle so as to permit free rotation about the wheel axis, a second arm extending from the bracket having an aperture at the distal end, a first hinge means comprising a first pin capable of pivotably connecting the first arm to the second arm by passing through the apertures; and a handle assembly for maneuvering the cooler over terrain comprising a pair of support members, each support member comprising a handle, an upper section comprising a first tube telescopingly engaged with a second tube, the handle being attached to the first tube, a lower section comprising a third tube sized to fit slidingly within the vertically disposed back aperture, and a second hinge means for pivotably connecting the second tube with the third tube.

The wheel assembly permits the wheel to be raised and out of the way when the cooler is not in a transport mode, thus providing a stable cooler.

Accordingly, it is a principal object of the present invention to provide a mobile cooler capable of being conveniently transported on the ground.

It is another object of the present invention to provide a mobile cooler having a set of retractable wheels and a collapsible handle.

It is still another object of the present invention to provide a mobile cooler having a set of retractable wheels which can be drawn over soft ground, such sand.

It is yet another object of the present invention to provide a mobile cooler having a telescoping handle which can collapse to fit conveniently and securely within the general exterior structure of the cooler compartment.

BRIEF DESCRIPTION OF THE DRAWINGS

FIG. 1 is a perspective view of the invention with the handles extended and the wheel mechanism retracted.

FIG. 2 is another perspective view of the invention with the handles folded and the wheel mechanism in the down position.

FIG. 3 is a side elevational view of the present invention with the wheel and handle assemblies retracted.

FIG. 4 is another side elevational view of the present invention, showing the cooler from the back.

DESCRIPTION OF THE INVENTION

Figure 5:
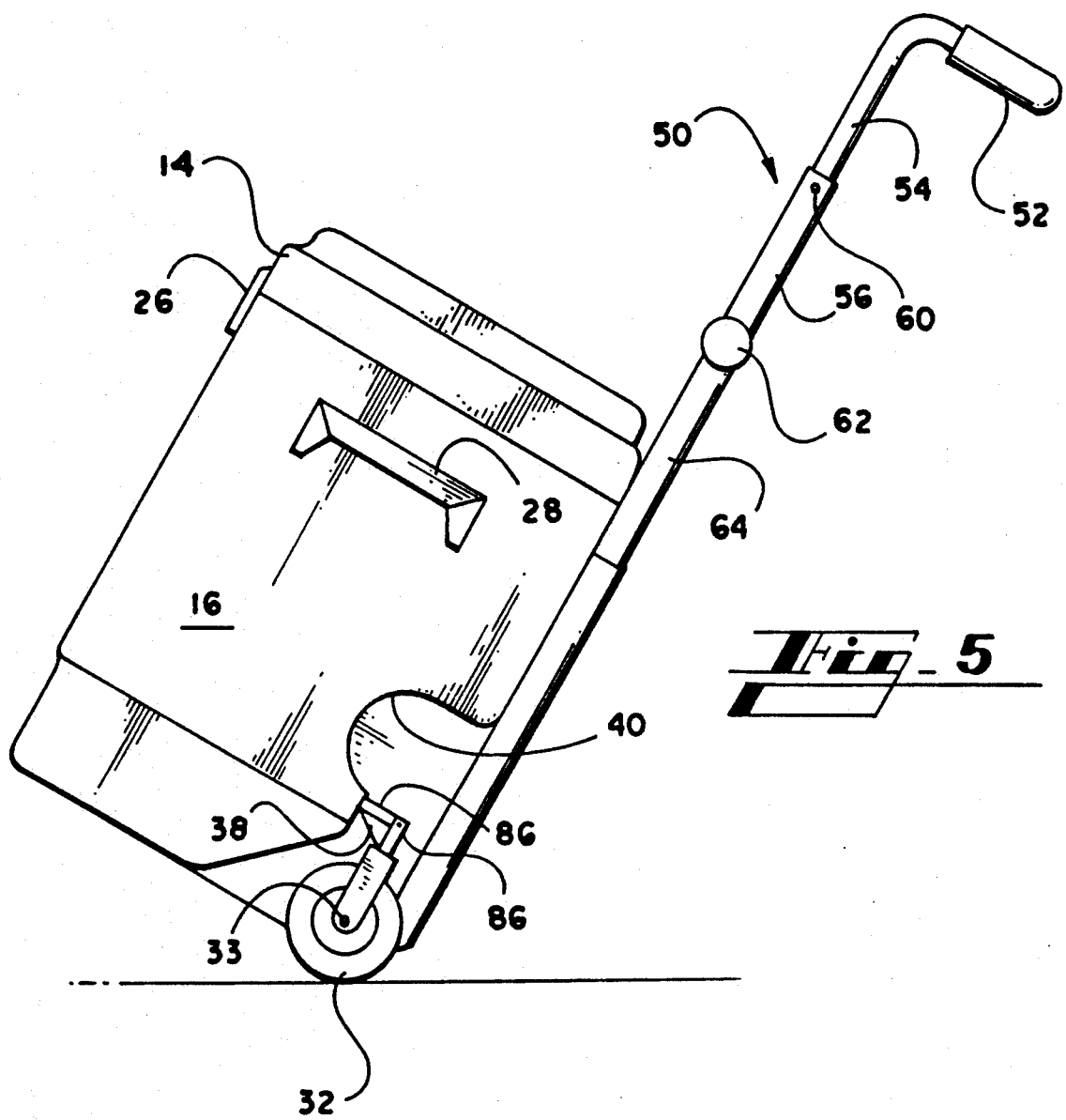
FIG. 5 is another side elevational view of the present invention showing the cooler tilted back on the wheel as when a user were transporting the cooler.

Referring to the drawings in which like numerals describe like parts throughout the several figures, FIGS. 1 and 2 are perspective drawings of a portable cooler shown generally as an apparatus 10, shown in an extended position suitable for being pulled or pushed by a user. A generally rectangular cooler 12 comprises a lid 14, left and right sides 16 and 18, a bottom 20, a front 22, and a back 24. The cooler 12 can be made of any commonly used material, such as plastic, and is preferably of a double walled construction with an internal sandwiched layer of insulation, such as Styrofoam. The lid 14 is connected to the back 24 by a conventional hinge (not shown). Alternatively, the lid 14 is not hinged, but fits snugly by a mating set of grooves (not shown) in the inside of the lid 14 and the cooler 12. The cooler can be held in a closed position by optional latch 26, which can be attached to the lid and detachably engages a protrusion on the cooler 12, as is commonly known in the art.

A pair of side handles 28 are attached at the upper portion of sides 16 and 18 to enable a user to hand carry the cooler 10.

A pair of wheel assemblies 30 located on the left and right sides 16 and 18 each comprise a wheel 32, which is made of rubber, plastic, metal, or the like, and is relative to its diameter to provide increased surface area, making transport easier over variable surfaces, such as sand and gravel. The width and diameter of the wheel are not critical, but the wheels are intended to be wide enough to easily roll over sand or other soft surfaces. In a preferred embodiment, the wheel is approximately four inches long and the diameter is three inches. The wheel 32 has an axle 33 passing axially through the center. The axle 33 is connected at each end to a rigid C-shaped bracket 34, which permits free rotation of the wheel 32 on its axle 33. Extending perpendicularly from the outside of the C-shaped bracket 34 is a pivotable arm 36, which connects to a pivot hinge 37 having a horizontal axis of rotation. The hinge 37 allows vertical arcuate movement of the bracket 34 from a position above the hinge 37 to a position below the hinge 37. Movement of the arm 36 beyond the vertical downward position is restricted by a right triangle shaped stop block 38. At the corner of the right angle is pivotably connected the hinge 37, connecting the wheel assembly 30 with the cooler 12. The block 38 is mounted to the cooler 12 so that the arm 36 abuts one side of the right triangle when in the down position, as shown in FIGS. 2 and 5.

A pair of recesses 40 (one for each wheel assembly) in the rearward portion of the cooler 12 permit placement of each wheel assembly 30 when in a retracted position, and a recess 42 permits pivoting of the wheel assembly 30 to the down position to gain contact with the ground when the wheel is in the down position. FIG. 3 is a side elevational view which shows the wheel assembly 30 in an up position, fitting within the recess 40.

A pair of handle assemblies 50 allows a user to roll the cooler 12 on the wheel 32 when the wheels 32 are in the down position and the cooler 12 is tilted back. Each handle assembly 50 comprises a handle grip 52, made of molded rubber or plastic, which form fits over the short portion of a hollow L-shaped tube 54. The long section of the L-shaped tube 54 fits telescopingly within a hollow tube 56. The tubes 54 and 56 are disengagingly held in a fixed relative position by a spring loaded pin 58 (not shown) in which the pin 58 attached to the tube 54 fits into a hole 60 in the tube 56, in a conventional manner. When a user wishes to shorten the overall length of the handle, he or she need merely depress the pin 58 transversely into the tube until it clears the thickness of the tube 56, and then slide the tube 54 into or out of the tube 56. Several spaced holes 60 are possible so as to provide an adjustable length feature to the handle assembly 50. This provides an additional advantage in that shorter or taller people can have the same ease of use. Optionally, a series of holes can be positioned around the circumference of the tube 56 so that the handle 52 can be turned inward or outward at the user's choice, and locked in place.

The tube 56 is connected to a vertically pivotable joint 62. The pivot 62 is connected in turn to a lower telescoping tube 64. The pivot 62 permits movement of the tube 56 from an approximately 90° angle to an approximately 180° angle with respect to the lower tube 64, but not beyond. In this manner the handle assembly will support the torque when used as a lever. The lower tube 64 fits telescopingly within a base tube 66, shown in phantom in FIG. 4. The base tube 66 is disposed within a support base 68 integrated with the back 24. The tubes 54, 56, 64 and 66 can be hollow lengths of plastic, aluminum, steel, or other strong rigid material, cut and formed as necessary. The tube A locking pin 69 is built into the support base 68 and extends transversely through the base and through an aperture (not shown) in the lower tube 64 when the tube 64 is in the extended position from the base. The pin 69 fixedly maintains the tube 64 in the extended position until the user withdraws the pin 69 fully or at least partly to be removed from the aperture in the lower tube 64.

The handle assembly 50 is shown fully extended in FIGS., 1 and 5. FIG. 5 shows the apparatus 10 tilted back on wheels 32 (shown in the down position) and ready for transport by a user. FIG. 5 shows an alternative embodiment of the positioning of the L-tube 54 and pin/hole 58/60. In this embodiment the handle grips 52 have been rotated inward 90°, providing an alternative arrangement for maneuvering the apparatus 10. FIG. 2 shows the handle assembly 50 in a folded position, whereby the tube 54 is telescoped within the tube 56 and the tube 64 is telescoped within the base tube 66. The joint 62 pivots so that the tubes 54 and 56 lie flat on the lid 14 in a set of the recessed grooves 70. This provides a flat surface on the lid 14 so that boxes or other apparatus 10 can be stacked on top. Moreover, the lid can be opened and the handle assembly 50 will pivot as well, so that the user does not have to manipulate the handle assembly 50 separately merely to gain access to the contents of the cooler 12.

In use the apparatus 10 can contain any variety of items, such as food, drink, ice and the like in the cooler 12 compartment. The handle grips 52 are pulled up from their recesses 70 and the handle assembly 50 extended. The pin 58 will lock into hole 60 and the joint 62 will not pivot beyond the line of the assembly. The wheel assembly 30 is rotated into the down position and the apparatus is tilted back using the wheels 32 as a fulcrum.

The present invention has the advantage of allowing a user to transport a cooler full of material a great distance that could otherwise result in severe strain to the arms, legs and back if carried by hand. The wheel assembly 30 conveniently permits the user to shift position of the wheels 32 without cumbersome movement of gears or levers, or undue lifting of the cooler to gain access to the wheel mechanism.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A portable cooler, comprising:
   a cooler compartment having a lid, bottom, sides, front and back;
   a recess in each corner of the lower end of the sides sized to receive a wheel;

a first arm extending outward from each recess each arm having an aperture located at the distal end capable of receiving a pin;

a pair of essentially parallel apertures disposed vertically in the back;

a pair of wheel assemblies one disposed within each recess each assembly comprising a wheel, an axle disposed axially through the center of the wheel, a bracket connected to each end of the axle so as to permit free rotation about the wheel axis, a second arm extending from the bracket having an aperture at the distal end, a first hinge means comprising a first pin capable of pivotably connecting the first arm to the second arm by passing through the apertures; and a handle assembly for maneuvering the cooler over terrain comprising a pair of support members, each support member comprising a handle, an upper section comprising a first tube telescopingly engaged with a second tube, the handle being attached to the first tube, a lower section comprising a third tube sized to fit slidingly within the vertically disposed back aperture, and a second hinge means for pivotably connecting the second tube with the third tube.

2. The cooler of claim 1, wherein the second hinge means permits pivoting movement from about 90° to about 180° between the second and third tube, but prevents pivoting movement at an angle greater than about 180°.

3. The cooler of claim 1, further comprising a stop block associated with the first arm to prevent over-pivoting of the second arm when the wheel assembly is pivoted from a raised to a lowered position.

4. The cooler of claim 1, wherein the second tube contains at least one aperture transversely disposed therein sized to receive a spring-loaded second pin and the first tube has a second pin transversely disposed within an aperture, whereby the second pin is engagingly and removable insertable through the second tube aperture so as to maintain the first and second tubes in an adjustably fixed position.

5. The cooler of claim 4, wherein the second tube contains a plurality of apertures disposed in a vertical line so as to permit the second pin to engage any one of the apertures in the first tube thereby permitting the user to adjust the height of the handle assembly.

6. The cooler of claim 4, wherein the second tube contains a plurality of apertures disposed in at least one generally horizontal line around the second tube so as to permit the second pin to engage any one of the apertures in the second tube thereby permitting the user to fix the handle with respect to the first tube in any of several different positions.

7. The cooler of claim 1, further comprising means for releasably locking the third tube in a fixed position comprising a locking pin disposed in an aperture in the back extending transversely toward the third tube and an aperture disposed transversely in the third tube capable of receiving the locking pin.

8. The cooler of claim 1, wherein the wheel and bracket can manually be pivoted from a raised position to a lowered position, whereby when in the lowered position the wheel contacts the ground when the cooler is on the ground in a manner permitting a user to tilt the cooler using the handles as a lever and the wheels as a fulcrum.

9. The cooler of claim 1, further comprising means for carrying the cooler comprising a pair of handle grips attached on either side of the compartment.

10. The cooler of claim 1, further comprising means for locking the lid in a closed position comprising a latch.

11. The cooler of claim 1, wherein the lid contains a plurality of grooved recesses sized to receive the handle and first and second tubes when the upper section is a folded position.

* * * * *